United States Patent [19]

Frank

[11] Patent Number: 5,794,977
[45] Date of Patent: Aug. 18, 1998

[54] D-RING HEIGHT ADJUSTER

[75] Inventor: Matthew C. Frank, Troy, Mich.

[73] Assignee: TRW Vehicle Safety Systems Inc., Lyndhurst, Ohio

[21] Appl. No.: 783,193

[22] Filed: Jan. 15, 1997

[51] Int. Cl.$^6$ ................................................ B60R 22/20
[52] U.S. Cl. ................................ 280/801.2; 280/808
[58] Field of Search ............................ 280/801.2, 808, 280/806; 297/483, 480

[56] References Cited

U.S. PATENT DOCUMENTS

| | | | |
|---|---|---|---|
| 4,556,255 | 12/1985 | Kawai | 280/801.2 |
| 4,610,464 | 9/1986 | Yasumatsu et al. | 280/801.2 |
| 4,711,498 | 12/1987 | Adomeit | 297/468 |
| 4,973,084 | 11/1990 | Biller | 280/801.2 |
| 5,167,428 | 12/1992 | Garret et al. | 280/801.2 |
| 5,280,959 | 1/1994 | Nanbu | 280/808 |
| 5,460,410 | 10/1995 | Petzi et al. | 280/801.2 |

FOREIGN PATENT DOCUMENTS

| | | | |
|---|---|---|---|
| 3151019 | 7/1983 | Germany. | |
| 195 00 268 | 5/1996 | Germany | 280/801.2 |
| 2204780 | 11/1988 | United Kingdom | 280/801.2 |

*Primary Examiner*—Peter C. English

*Attorney, Agent, or Firm*—Tarolli, Sundheim, Covell, Tummino & Szabo

[57] ABSTRACT

A seat belt webbing guide assembly (10) includes a base (50) mountable on a portion (42) of a vehicle. The base (50) includes a wall (60) and first and second columns (80, 82) of projections which project in a first direction (84) from the wall on opposite sides of an axis (62). Each one of the first projections (90, 92) is spaced apart axially from each one of the second projections (102, 104, 106). A carriage (120) is supported on the base (50) for axial sliding movement relative to the base. A seat belt guide (24) is located on the carriage (120). A first latch (170) on the carriage (120) is movable between a disengaged condition movable axially past the first projections (90, 92) and an engaged condition engageable with one of the first projections to block axial movement of the first latch and the carriage relative to the base (50). A second latch (200) on the carriage (120) is movable between a disengaged condition movable axially past the second projections (102, 104, 106) and an engaged condition engageable with one of the second projections to block axial movement of the second latch and the carriage relative to the base (50). The assembly (10) includes biasing springs (194, 208) for biasing the first and second latches (170, 200) into the engaged condition, and a release lever (220) for moving the first and second latches to the disengaged condition.

19 Claims, 4 Drawing Sheets

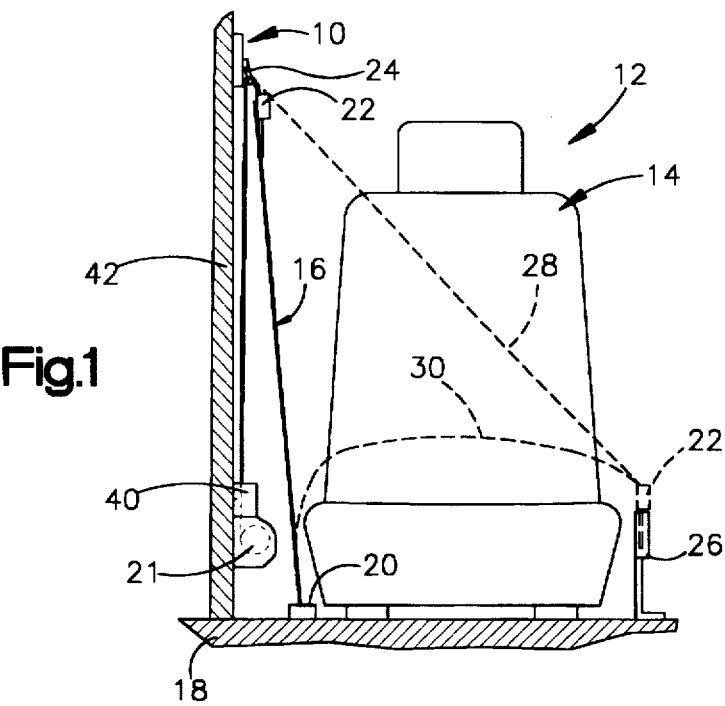
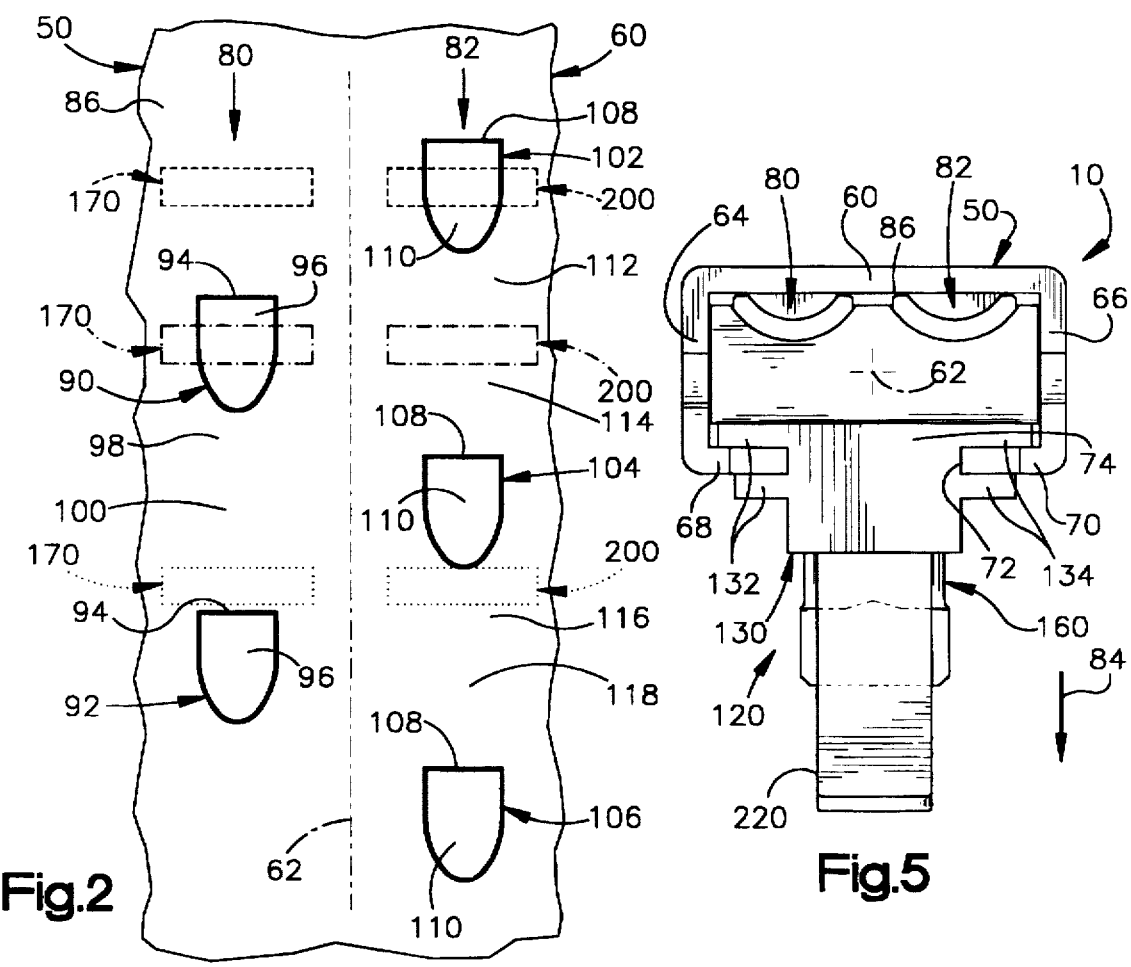

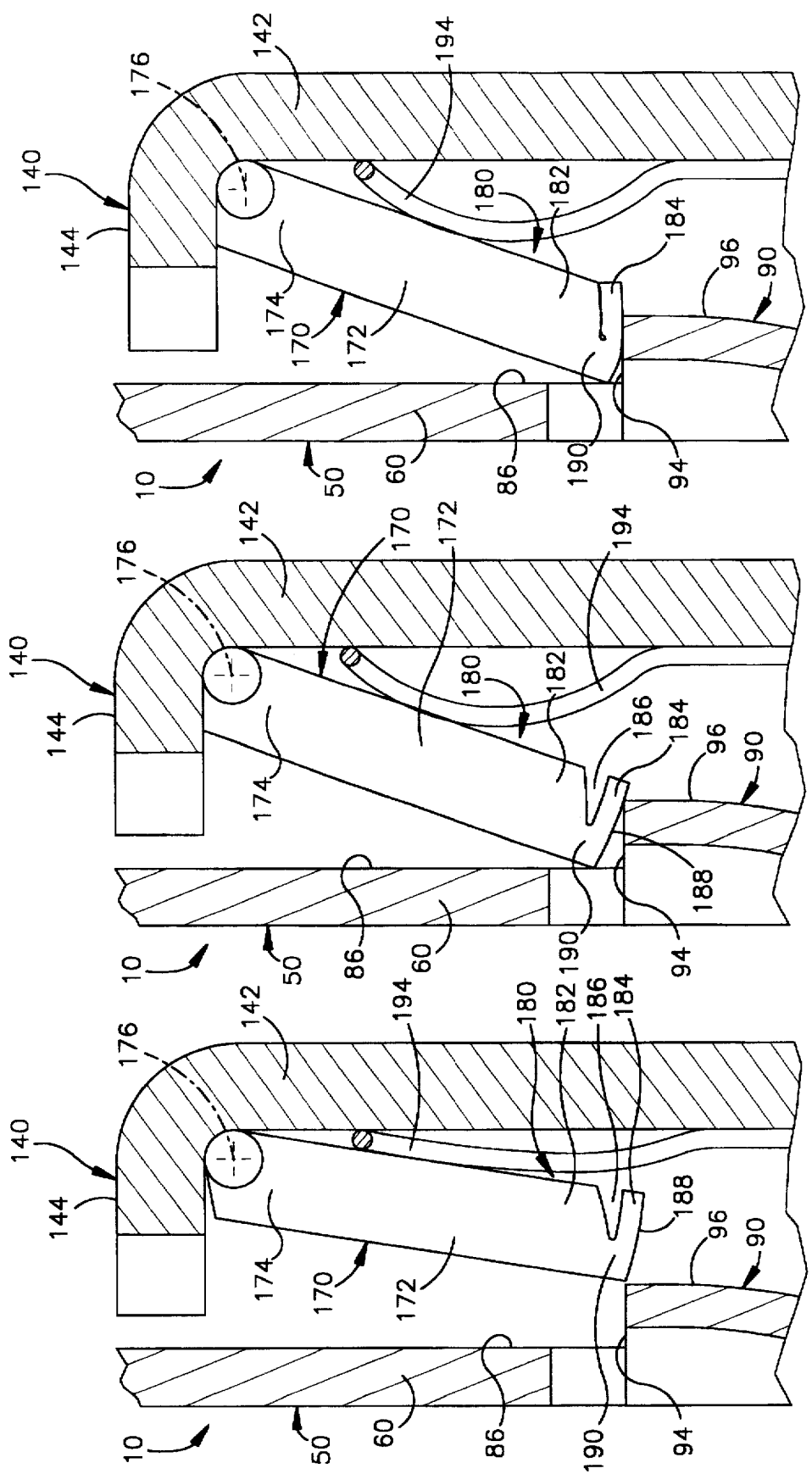

D-RING HEIGHT ADJUSTER

BACKGROUND OF THE INVENTION

1. Technical Field

The present invention relates to a vehicle occupant safety apparatus and, in particular, to a vehicle seat belt system including a seat belt webbing height adjuster and a pretensioner for taking up slack in the seat belt in the event of a vehicle collision.

2. Description of the Prior Art

Vehicle seat belt systems use seat belt webbing to restrain movement of a vehicle occupant. It is known to include a pretensioner in such a system. In the event of vehicle deceleration above a predetermined threshold level, such as occurs in a vehicle collision, the pretensioner is actuated to tension the belt webbing and to take up slack in the belt webbing.

It is also known to include a manually adjustable seat belt webbing height adjuster in a seat belt system. The belt webbing passes through a D-ring that is supported on the height adjuster at a location adjacent to the shoulder of the vehicle occupant. The height adjuster enables the vehicle occupant to set the vertical position of the D-ring to one of several vertically spaced locking positions. In some height adjusters, the D-ring can, at times, be positioned vertically between locking positions.

Some seat belt systems include both a pretensioner and a height adjuster. When the pretensioner is actuated, the tensioned belt webbing exerts a strong downward force on the D-ring. If the pretensioner is actuated when the D-ring is not at a locking position, the D-ring is pulled downward along the height adjuster until it locks. It is desirable to ensure that the D-ring locks at the next available downward locking position and does not skip past one or more locking positions before engaging.

SUMMARY OF THE INVENTION

The present invention is a vehicle seat belt guide assembly comprising a base mountable on a portion of a vehicle. The base includes a wall and first and second columns of projections which project in a first direction from the wall on opposite sides of an axis of the assembly. Each one of the first projections is spaced apart axially from each one of the second projections. A carriage is supported on the base for axial sliding movement relative to the base. A seat belt guide is located on the carriage. A first latch on the carriage is movable between a disengaged condition movable axially past the first projections and an engaged condition engageable with one of the first projections to block axial movement of the first latch and the carriage relative to the base. A second latch on the carriage is movable between a disengaged condition movable axially past the second projections and an engaged condition engageable with one of the second projections to block axial movement of the second latch and the carriage relative to the base. The assembly includes biasing means for biasing the first and second latches into the engaged condition, and release means for moving the first and second latches to the disengaged condition to permit axial movement of the carriage relative to the base.

BRIEF DESCRIPTION OF THE DRAWINGS

Further features of the present invention will become apparent to one skilled in the art to which the present invention relates from reading the following specification with reference to the accompanying drawings, in which:

FIG. 1 is a schematic illustration of a vehicle seat belt system including a pretensioner and a seat belt webbing height adjuster constructed in accordance with the present invention;

FIG. 2 is a schematic illustration showing the relative locking positions of the height adjuster of FIG. 1;

FIG. 5 is a top plan view of the height adjuster taken along line 5—5 of FIG. 4;

FIG. 7 is a schematic illustration of parts of the latching mechanism of the height adjuster, shown in a disengaged condition;

FIG. 8 is a view similar to FIG. 7 with the parts of the latching mechanism shown in a locking condition; and FIG. 9 is a view similar to FIG. 7 with the parts of the latching mechanism shown in a condition after operation of the pretensioner of the seat belt system of FIG. 1.

DESCRIPTION OF A PREFERRED EMBODIMENT

Figure 3:
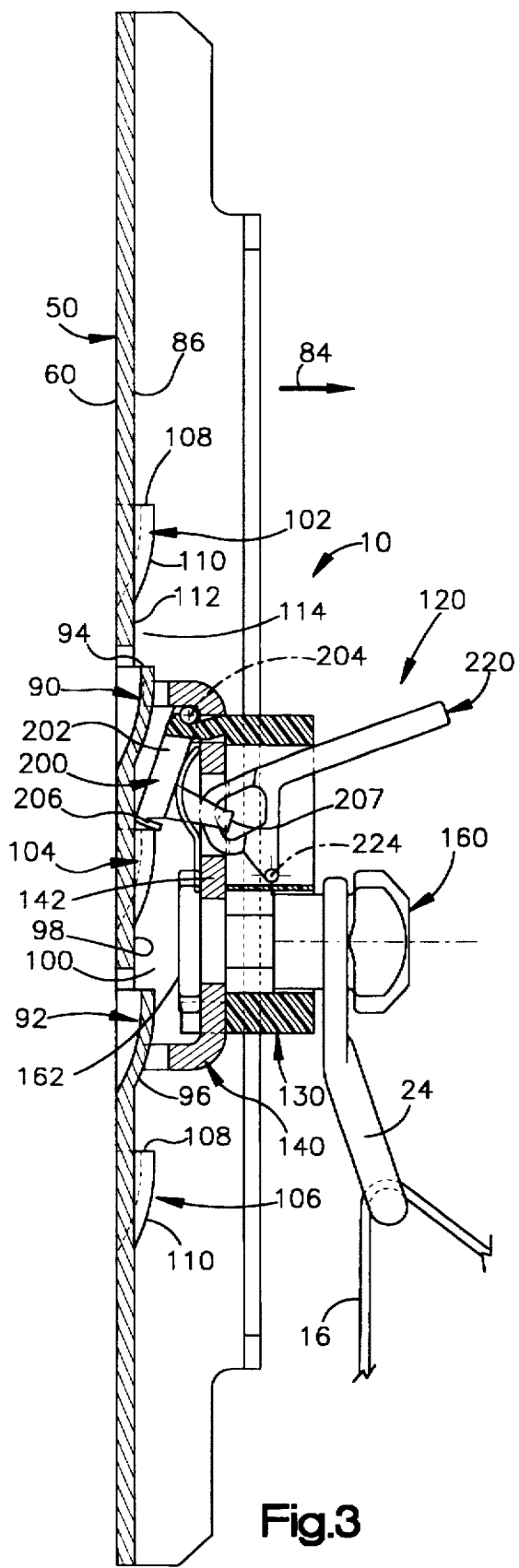
FIG. 3 is a longitudinal view, partially in section, of the height adjuster of FIG. 1, shown in a locking condition.

The present invention relates to a vehicle seat belt webbing guide height adjuster. As representative of the present invention, FIG. 1 illustrates a vehicle seat belt webbing guide height adjuster 10. The height adjuster 10 is incorporated in a three-point continuous loop seat belt system 12 for use in restraining an occupant of a vehicle.

During operation of the vehicle, the occupant of the vehicle sits on a seat 14 in the vehicle. A length of seat belt webbing 16 is extensible about the vehicle occupant. One end of the length of belt webbing 16 is anchored to the vehicle body 18 at an anchor point 20 located on one side of the seat 14. The opposite end of the belt webbing 16 is attached to a retractor 21 which is secured to the vehicle body on the same side of the seat 14.

Intermediate its ends, the belt webbing 16 passes through a tongue assembly 22 and a D-ring 24 that is located above the retractor 21 and the anchor point 20. The D-ring 24 is supported on the height adjuster 10 in a manner described below. When the seat belt system 12 is not in use, the belt webbing 16 is wound on the retractor 21 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 21. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The seat belt system 12 includes a pretensioner 40 connected with the belt webbing 16. The pretensioner 40 is disposed adjacent to, or may be incorporated in, the retractor 21. The pretensioner 40 is actuatable to tension the belt webbing 16 in a manner described below to take up slack in the belt webbing.

The height adjuster 10 (FIGS. 2–6) includes a rail or base 50 which is secured to a portion of the vehicle, such as the vehicle B-pillar 42, by fasteners (not shown) extending through a pair of fastener openings 52. The base 50 could, alternatively, be formed as a portion of the vehicle itself. The base 50 extends generally vertically in the vehicle and has an upper end portion 54 and an opposite lower end portion 56. The base 50 is preferably formed from steel with a generally C-shaped cross-sectional configuration as viewed from above (FIG. 5). The base 50 includes a back wall 60 which extends parallel to an axis 62 of the height adjuster 10. The back wall 60 has a major side surface 86.

Spaced, parallel side walls 64 and 66 of the base 50 extend outward from the back wall 60. Front walls 68 and 70 of the base 50 are spaced from the back wall 60 and extend toward each other from the side walls 64 and 66, respectively, to define an axially extending slot 72 in the base 50. The walls 60, 64, 66, 68 and 70 of the base 50 define an axially extending central passage 74 in the base. The slot 72 opens into the central passage 74.

The base 50 includes first and second columns 80 and 82 of locking features on opposite sides of the axis 62. Each one of the locking features in column 80 is spaced apart axially from each one of the second locking features in column 82. In the preferred embodiment, the locking features in columns 80 and 82 are teeth or projections which project in a first direction 84 from the major side surface 86 of the back wall 60 into the central passage 74 in the base. The first and second columns 80 and 82 of projections are spaced apart on opposite sides of the axis 62.

The first column 80 of projections includes, in the illustrated embodiment, two first projections 90 and 92 on the base 50. Each one of the first projections 90 and 92 is formed by deforming a portion of the material of the back wall 60 of the base 50, in the first direction 84, into the central passage 74 in the base.

Each one of the first projections 90 and 92 has at its upper end a planar engagement surface 94 (FIG. 2) oriented perpendicular to the axis 62. Each one of the first projections 90 and 92 also has a curved outer side surface 96 which tapers from the engagement surface 94 in a downward direction to merge into the major side surface 86 of the back wall 60. A portion 98 of the major side surface 86 of the back wall 60 is exposed in a gap 100 between the two first projections 90 and 92.

The second column 82 of projections includes, in the illustrated embodiment, three second projections 102, 104 and 106 on the base 50. Each one of the second projections 102–106 is formed by deforming a portion of the material of the back wall 60 of the base 50, in the first direction 84, into the central passage 74 in the base.

Each one of the second projections 102–106 has at its upper end a planar engagement surface 108 oriented perpendicular to the axis 62. Each one of the second projections 102–106 has a curved outer side surface 110 which tapers from the engagement surface 108 in a downward direction to merge into the major side surface 86 of the back wall 60. A portion 112 of the major side surface 86 of the back wall 60 is exposed in a gap 114 between the upper two second projections 102 and 104. A portion 116 of the major side surface 86 of the back wall 60 is exposed in a gap 118 between the lower two second projections 104 and 106.

The first projections 90–92 and the second projections 102–106 are staggered relative to each other, that is, they are placed alternately on either side of the axis 62. As a result, each one of the first projections 90 and 92 is spaced apart axially from each one of the second projections 102–106.

For example, the upper first projection 90 (FIG. 2) is at the same vertical position along the base 50 as the gap 114 between the upper two second projections 102 and 104. The lower first projection 92 is at the same vertical position along the base 50 as the gap 118 between the lower two second projections 104 and 106. Similarly, the middle second projection 104 is at the same vertical position along the base 50 as the gap 100 between the two first projections 90 and 92.

As a result of the staggered relationship of the first and second columns 80 and 82 of projections, each one of the second projections 102–106 is axially coextensive with a portion of the major side surface 86 of the back wall 60 on the opposite side of the axis 62, and is not axially coextensive with any of the first projections 90–92. Similarly, each one of the first projections 90–92 is axially coextensive with a portion of the major side surface 86 of the back wall 60 on the opposite side of the axis 62, and is not axially coextensive with any of the second projections 102–106.

The height adjuster 10 includes a carriage 120 (FIGS. 3–6) which is slidable axially along the base 50. The carriage includes a plastic glider 130 and a metal slider plate 140. The glider 130 has two pairs of ribs 132 and 134 (FIG. 5) which slidably engage the opposite front walls 68 and 70 of the base 50. The ribs 132 and 134 support the glider 130 on the base 50 for sliding movement relative to the base. A plurality of slider plate support tabs 136 (FIG. 6) on the glider 130 project toward the back wall 60 of the base 50. A plurality of latch support members 138 at the upper end of the glider 130 extend toward the back wall 60 of the base 50.

The slider plate 140 has a generally C-shaped cross-sectional configuration as viewed from the side (FIG. 3), including an outer wall 142 which is parallel to, and spaced apart from, the back wall 60 of the base 50. The slider plate 140 has spaced, parallel upper and lower arms 144 and 146 (FIG. 6) which project from the outer wall 142 in a direction toward the back wall 60 of the base 50. Each one of the upper and lower arms 144 and 146 has clearance openings 148 to enable sliding movement of the slider plate 140 past the projections 90–92 and 102–106 on the base 50. Slots in the slider plate 140 receive the support tabs 136 on the glider 130 so that the glider supports the slider plate on the base 50 for axial sliding movement relative to the base.

A support bolt 160 is fixed to the outer wall 142 of the slider plate 140 by a press nut 162. The support bolt 160 projects from the outer wall 142 of the slider plate 140 in the first direction 84, that is, away from the back wall 60 of the base 50. The support bolt 160 extends through the slot 72 in the base 50. The D-ring 24 is pivotally mounted on the shank of the support bolt 160 for vertical movement with the support bolt.

The height adjuster 10 includes a latch mechanism 168 (FIG. 6) which is carried on the slider plate 140. The latch mechanism 168 includes identical first and second latch parts or latches 170 and 200 spaced apart on opposite sides of the axis 62.

The first latch 170, best seen in FIGS. 7–9, is preferably made from steel and includes a main body portion 172. The main body portion 172 of the first latch 170 includes an upper end portion 174 of the first latch. The upper end portion 174 of the first latch 170 engages the latch support members 138 (not shown in FIGS. 7–9) of the glider 130. The first latch 170 is, thereby, supported for pivotal movement relative to the glider 130 and the base 50 about a pivot axis 176.

The first latch 170 has a lower end portion 180 which includes a lower part 182 of the main body portion 172 of the first latch. An actuator arm (not shown) of the first latch 170 extends from the lower end portion 180 of the first latch in a direction away from the back wall 60 of the base 50. The actuator arm of the first latch 170 is similar in configuration to the actuator arm 207 (FIG. 3) of the second latch 200, described below.

The lower end portion 180 of the first latch 170 includes an engagement arm 184 separated by a wedge-shaped slot 186 from the lower part 182 of the main body portion 172 of the first latch. The engagement arm 184 has an arcuate outer surface 188 centered on the pivot axis 176 of the first latch 170.

A deformable connector portion 190 of the first latch 170 connects the engagement arm 184 and the main body portion 172. The connector portion 190 is strong enough to block movement of the engagement arm 184 relative to the main body portion 172 during normal vehicle usage. The connector portion 190 is deformable under load from the pretensioner 40 (FIG. 1) in a manner described below. The connector portion 190 may also be deformable under occupant loads imposed during a vehicle collision.

The latch mechanism 168 includes a first spring 194 which acts between the slider plate 140 and the first latch 170. The first spring 194 biases the first latch 170 in a direction toward the major side surface 86 of the back wall 60 of the base 50.

The second latch 200 (FIGS. 3 and 4) is a mirror image of the first latch 170 and so is described only briefly. The second latch 200 includes an upper end portion 202 which engages the latch support members of the glider 130. The second latch 200 is supported for pivotal movement about a pivot axis 204 relative to the slider plate 140 and to the base 50. The second latch 200 has a lower end portion 206. An actuator arm 207 of the second latch 200 extends from the lower end portion 206 of the second latch in a direction away from the back wall 60 of the base 50.

The latch mechanism 168 includes a second spring 208 (FIG. 6) which acts between the slider plate 140 and the second latch 200. The second spring 208 biases the second latch 200 in a direction toward the major side surface 86 of the back wall 60 of the base 50. The second spring 208 may be formed as one piece with the first spring 194.

The height adjuster 10 includes a release lever 220 (FIGS. 3 and 4) for moving the first and second latches 170 and 200 in a direction away from the back wall 60 of the base 50 to permit sliding movement of the slider plate 140 relative to the base 50. The release lever 220 is supported on the glider 130 for pivotal movement about an axis 224 relative to the glider. The release lever 220 has a loop portion 222 which is engageable with the actuator arm 207 of the second latch 200 and with the actuator arm of the first latch 170.

Each one of the latches 170 and 200 has four possible conditions relative to the base 50, depending on whether the release lever 220 is actuated and depending on the vertical position of the carriage 120 relative to the base 50.

Figure 4:
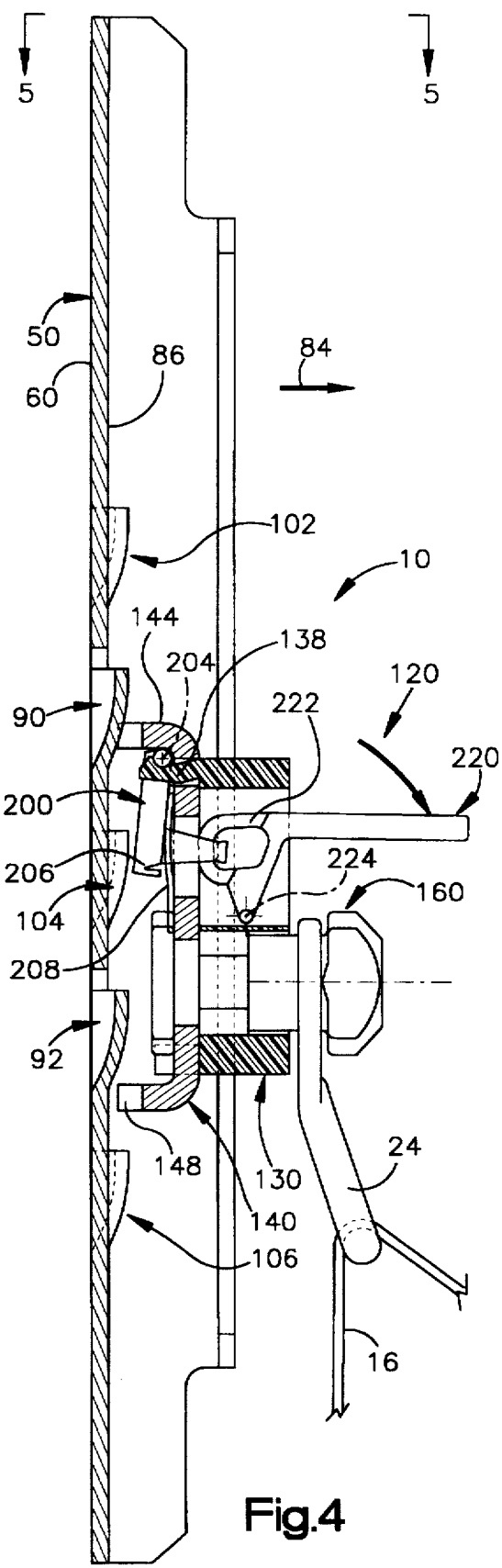
FIG. 4 is a view similar to FIG. 3, with the height adjuster shown in a disengaged condition.
Figure 6:
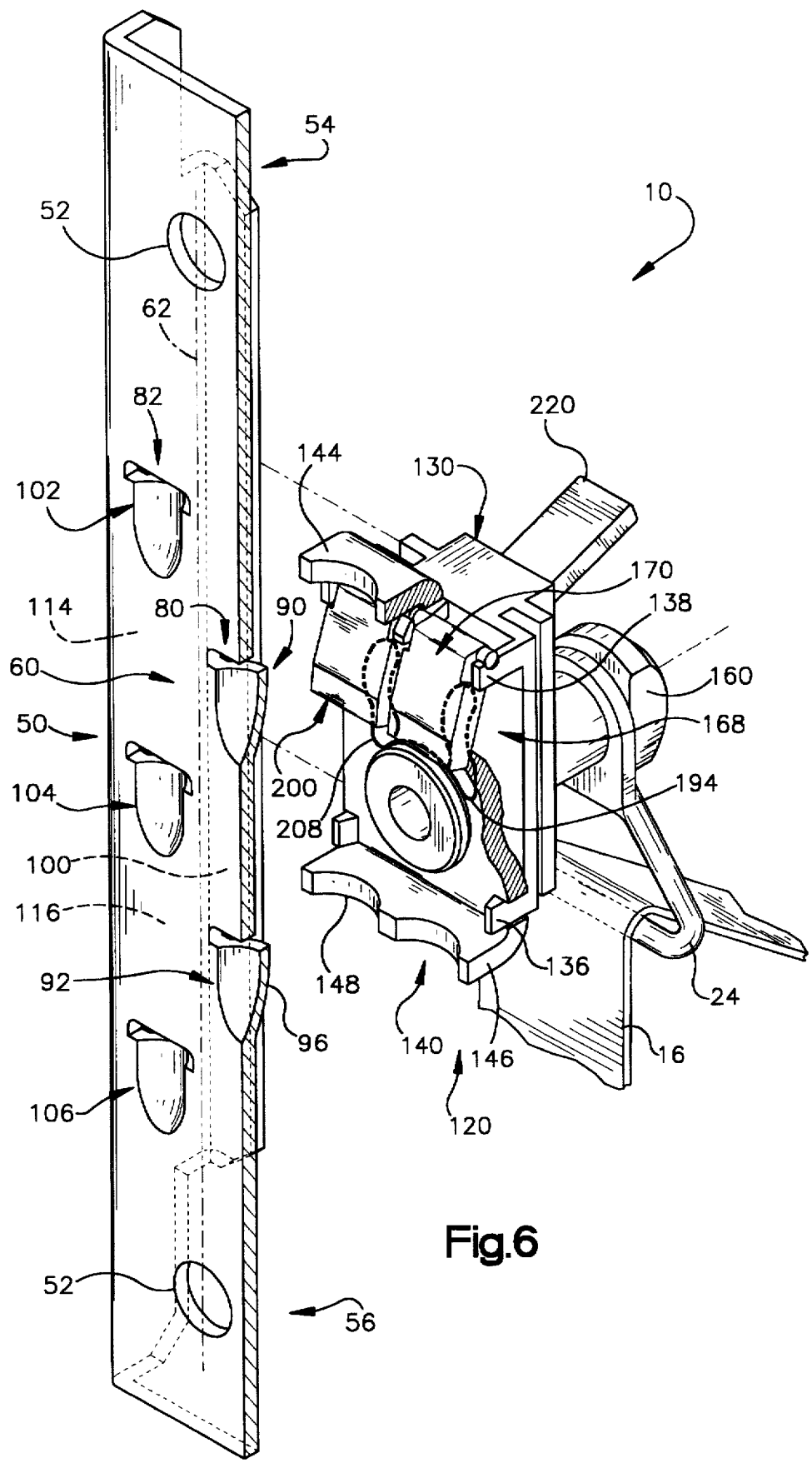
FIG. 6 is an exploded perspective view, partially broken away, of parts of the height adjuster.

When the release lever 220 is actuated, as shown in FIG. 4, the latches 170 and 200 are spaced apart far enough from the back wall 60 of the base 50 so that each one of the latches is movable vertically without engaging any of the projections on the base 50. FIG. 4, as an example, illustrates the second latch 200 in this released or disengaged condition. FIG. 7 illustrates the first latch 170 in the disengaged condition.

When the release lever 220 is not actuated, the springs 194 and 208 bias the latches 170 and 200, respectively, into engagement with the back wall 60 of the base 50. Each one of the latches 170 and 200 has three possible conditions in engagement with the base 50, depending on the vertical position of the carriage 120 relative to the base 50.

The first of these three conditions is a locking condition. FIG. 3, as an example, illustrates the second latch 200 in a locking condition in which the lower end portion 206 of the second latch 200 is also in abutting engagement with the major side surface 86 of the back wall 60 of the base 50. The lower end portion 206 of the second latch 200 is also in abutting engagement with the engagement surface 108 on the second projection 104. The second projection 104 blocks downward movement of the second latch 200 relative to the base 50. As a result, the carriage 120 and the D-ring 24 are blocked from downward movement relative to the base 50. As another example, FIG. 8 illustrates the first latch 170 in the locking condition.

The second possible condition in which each one of the latches 170 and 200 can be located, when the release lever 220 is not actuated, is a "ready" condition. A latch 170 or 200 is in an "engaged" condition when it is in either the ready condition or the locking condition. FIG. 2, as an example, illustrates schematically, in dashed lines, the first latch 170 in the ready condition. The first latch 170 is in abutting engagement with the major side surface 86 of the back wall 60 of the base 50. The first latch 170 is not, however, in abutting engagement with engagement surface 94 on either of the first projections 90 and 92 of the base 50. The first projections 90 and 92 do not block downward movement of the first latch 170 relative to the base 50. The first latch 170 does not block downward movement of the carriage 120 and the D-ring 24 relative to the base 50.

The third possible condition in which each one of the latches 170 and 200 can be located, when the release lever 220 is not actuated, is an "intermediate" condition. FIG. 2, as an example, illustrates schematically, in dot-dash lines, the first latch 170 in the intermediate condition. The first latch 170 is in engagement with the outer side surface 96 of the first projection 90. The first latch 170 is spaced apart from the major side surface 86 of the back wall 60 of the base 50. The first projections 90 and 92 do not block downward movement of the first latch 170 relative to the base 50. The first latch 170 does not block downward movement of the carriage 120 and the D-ring 24 relative to the base 50.

The height adjuster 10 is manually operable by an occupant of the vehicle seat 14 to adjust the vertical position of the D-ring 24. To adjust the vertical position of the D-ring 24 downward, the vehicle occupant pushes the release lever 220 downward. The release lever 220 pivots relative to the glider 130 and pulls the actuator arms of the first and second latches 170 and 200 outward, that is, in the first direction 84 away from the back wall 60 of the base 50. The first and second latches 170 and 200 move simultaneously to the disengaged position, against the bias of the springs 194 and 208.

Because the movement of the first and second latches 170 and 200 is identical, only the movement of the first latch 170 is described herein. The first latch 170 moves from the locking condition shown in FIG. 8 to the disengaged condition shown in FIG. 7. Because the outer surface 188 of the engagement arm 184 has an arcuate configuration centered on the pivot axis 176 of the first latch 170, the first latch is able to move relatively freely from the locking condition to the disengaged condition. The vehicle occupant does not need to raise the carriage 120 vertically to permit the first latch 170 to clear the first projection 90 or 92 against which the first latch had been engaged. The downward force on the lever 220 also causes the slider plate 140 and the latches 170 and 200 to move vertically down the base 50.

When the vehicle occupant thereafter releases the release lever 220, the springs 194 and 208 urge the latches 170 and 200 to pivot toward the back wall 60 of the base 50. Any subsequent downward force on the D-ring 24 causes the slider plate 140 and the latches 170 and 200 to slide downward, along the base 50, until one of the first and second latches engages one of the first and second projections 90–92 and 102–106.

For example, if the latches 170 and 200 are at the vertical position shown in dashed lines in FIG. 2 when the vehicle occupant releases the release lever 220, then subsequent downward movement of the latches, such as by the vehicle occupant pulling the carriage 120 down, results in the first latch 170 engaging the first projection 90. This engagement blocks further downward movement of the first latch 170 and, therefore, of the carriage 120 and the D-ring 24. At the same time, the second latch 200 moves into the gap 114 between the second projection 102 and the second projection 104. The second latch 200, when in the gap 114, is in the ready position. The second latch 200 is not resting on the outer side surface 110 of any of the second projections 102–106. The second latch 200 has the same orientation relative to the base 50 as the first latch 170.

As another example, the latches 170 and 200 may be in the condition shown in dotted lines in FIG. 2 when the vehicle occupant releases the release lever 220. In this case, the first latch 170 would be in the locking condition, and the second latch 200 would be in the ready condition. The height adjuster 10 would be locked, because the latch 170 would be in the locking condition.

In the event of vehicle deceleration above a predetermined threshold level, electric circuitry (not shown) of the vehicle actuates the pretensioner 40 in a known manner. The pretensioner 40 tightens the torso portion 28 of the belt webbing 16 about the vehicle occupant and reduces slack in the belt webbing.

If either one of the latches 170 and 200 is in the locking condition when the pretensioner 40 is actuated, that is, if the height adjuster 10 is locked, then the D-ring 24 can not move downward. The belt webbing 16 is rapidly tensioned and is tightened about the torso of the vehicle occupant.

If neither the first latch 170 nor the second latch 200 is in the locking condition when the pretensioner 40 is actuated, the height adjuster 10 is not locked. If the height adjuster 10 is not locked when the pretensioner 40 is actuated, the tensile force in the belt webbing 16 causes the D-ring 24 to move downward along the height adjuster 10 until the height adjuster locks. This downward movement takes a small amount of time and results in a slight delay in the tensioning of the belt webbing 16.

This delay is minimized by the staggered relationship of the two columns 80 and 82 of projections on the base 50. Because of this staggered relationship, one or the other of the two latches 170 and 200 is always in the ready condition—that is, against the major side surface 86 of the back wall 60 of the base 50 and ready to engage one of the projections on the base upon downward movement of the D-ring 24. This is the case even if one of the latches 170 and 200 is in the intermediate position, that is, spaced apart from the major side surface 86 of the back wall 60 of the base 50.

For example, if the latches 170 and 200 are at the vertical position shown in dot-dash lines in FIG. 2, prior to actuation of the pretensioner 40, the first latch 170 is in the intermediate condition, resting on the outer side surface 96 of the first projection 90. The first latch 170 would need to move laterally, that is, in a direction toward the back wall 60 of the base 50, in order to be in a position to lock on the first projection 92. The only force for moving the first latch 170 from the intermediate condition to the ready condition comes from the first spring 194. If the downward acceleration of the carriage 120 due to the pretensioner 40 were sufficiently great, the biasing force of the first spring 194 might be insufficient to overcome the inertia of the first latch 170 and move the first latch into the ready condition before the first latch reaches the first projection 92. Thus, there could be insufficient engagement between the first latch 170 and the first projection 92 to prevent further axial movement of the first latch. The first latch 170 might, therefore, skip past the first projection 92.

However, because of the staggered relationship of the first and second columns 80 and 82 of projections, the second latch 200 is in the ready condition when the first latch 170 is in the intermediate condition. Downward movement of the D-ring 24, in response to actuation of the pretensioner 40, pulls the second latch 200 down into engagement with the second projection 104. This engagement occurs without the need for any lateral movement of the second latch 200 in a direction toward the back wall 60 of the base 50. As a result, the height adjuster 10 locks in the next downward locking position, that is, when the second latch engages 200 the second projection 104. This engagement blocks further downward movement of the second latch 200 and, therefore, of the carriage 120 and the D-ring 24. The delay in tensioning of the belt webbing 16 is reduced because the height adjuster 10 locks in the next downward locking position.

As another example, if the latches 170 and 200 are at the vertical position shown schematically in dashed lines in FIG. 2 prior to actuation of the pretensioner 40, the first latch 170 is in the ready condition, in abutting engagement with the major side surface 86 of the back wall 60 of the base 50. Downward movement of the D-ring 24, in response to actuation of the pretensioner 40, pulls the latches 170 and 200 down. Because the lower end portion 180 of the first latch 170 is in abutting engagement with the major side surface of the back wall 60 of the base 50, the first latch does not have to move laterally, that is, in a direction toward the back wall of the base, in order to be in a position to engage and lock on the first projection 90. As a result, the height adjuster 10 locks in the next downward locking position, that is, when the first latch 170 engages the first projection 90. This engagement blocks further downward movement of the first latch 170 and, therefore, of the carriage plate 120 and the D-ring 24. Again, the delay in tensioning of the belt webbing 16 is reduced because the height adjuster 10 locks in the next downward locking position.

Upward adjustment of the D-ring 24 does not require actuation of the release lever 220. Upwardly directed force on the movable parts of the height adjuster 10 causes the carriage 120 to move upward. The projections on the base 50 cam the latches 170 and 200 outward to allow relatively unrestricted upward movement.

The lower end portions of the latches 170 and 200 are designed to deform under the load experienced in a pretensioning operation, but not in normal (unpretensioned) operation of the seat belt system 12. For example, when the first latch 170 is in a locking condition on the first projection 90 as shown in FIG. 8, vertical load on the D-ring 24 is transferred through the support bolt 160 into the slider plate 140. The load on the slider plate 140 is transmitted from the upper arm 144 of the slider plate, vertically through the first latch 170, and into the first projection 90.

The connector portion 190 of the first latch 170 is strong enough so that the load experienced in normal (unpretensioned) operation of the seat belt system 12 does not deform the connector portion of the first latch. The downward force on the first latch 170 is resisted strongly enough by the undeformed first latch to block downward movement of the slider plate 140 and, thus, of the D-ring 24.

In a pretensioning operation, the vertical load on the D-ring 24 and on the height adjuster 10 is substantially greater. This load may be sufficient to deform the connector portion 190 of the first latch 170. If this occurs, the engagement arm 184 of the first latch 170 moves from the condition shown in FIG. 8 to the condition shown in FIG. 9. The wedge-shaped slot 186 in the lower end portion 180 of the first latch 170 at least partially closes. The engagement arm 184 transmits force between the first projection 90 and the main body portion 172 of the first latch 170 to block further downward movement of the D-ring 24. The configuration of the first latch 170, when the first latch is in the condition shown in FIG. 9, minimizes the possibility that the first latch could "cam out" of engagement with the first projection 90. That is, the first latch 170 is less likely, under the load from the pretensioner 40, to pivot from the position shown in FIG. 9 to the position shown in FIG. 7. As a result, the height adjuster 10 is maintained in the locked condition during the pretensioning operation.

From the above description of the invention, those skilled in the art will perceive improvements, changes and modifications in the invention. For example, the height adjuster can be mounted on another portion of the vehicle, such as the seat frame. The base 50 can be curved to match curvature of the B-pillar. The base 50 can be of the type mounted with a single bolt at the top and two hooks at the lower end. The locking features can be something other than projections, such as, for example, openings. The latches could be parts of a single latch member which rocks from side to side, for example. Such improvements, changes and modifications within the skill of the art are intended to be covered by the appended claims.

Having described the invention, I claim:

1. A vehicle seat belt guide assembly comprising:
 a base mountable on a portion of a vehicle, said base including a wall and including first and second columns of projections which project in a first direction from said wall on opposite sides of an axis of said assembly, each one of said first projections being spaced apart axially from each one of said second projections;
 a carriage supported on said base for axial sliding movement relative to said base;
 a seat belt guide on said carriage;
 a first latch on said carriage, said first latch being movable between a disengaged condition movable axially past said first projections and an engaged condition engageable with one of said first projections to block axial movement of said first latch and said carriage relative to said base;
 a second latch on said carriage, said second latch being movable between a disengaged condition movable axially past said second projections and an engaged condition engageable with one of said second projections to block axial movement of said second latch and said carriage relative to said base;
 biasing means for biasing said first and second latches into the engaged condition; and
 release means for moving said first and second latches to the disengaged condition.

2. An assembly as set forth in claim 1 wherein said first projections and said second projections are placed alternately on either side of said axis.

3. An assembly as set forth in claim 1 wherein said wall of said base has a major side surface from which said projections project in the first direction, said first and second latches when in the engaged condition being in abutting engagement with said major side surface of said wall of said base.

4. An assembly as set forth in claim 3 wherein said first projections and said second projections are placed alternately on either side of said axis.

5. An assembly as set forth in claim 3 wherein at least one of said first and second latches is in abutting engagement with said major side surface of said wall of said base when said release means is unactuated.

6. An assembly as set forth in claim 5 wherein said first projections and said second projections are placed alternately on either side of said axis.

7. An assembly as set forth in claim 1 wherein each one of said first and second latches is supported on said carriage for pivotal movement about a pivot axis between the disengaged condition and the engaged condition, said first and second latches having respective arcuate engagement surfaces centered on said pivot axis and engageable with said first and second projections, respectively.

8. An assembly as set forth in claim 1 wherein said first and second latches have respective end portions engageable with said first and second projections, respectively, said end portions being deformable in response to application to said seat belt guide of a force having a magnitude greater than a predetermined amount to block movement of said first and second latches from the engaged condition to the disengaged condition.

9. A vehicle seat belt guide assembly comprising:
 a base mountable on a portion of a vehicle, said base including a wall having a major side surface and including a first plurality of fixed projections which project in a first direction from said major side surface of said wall at locations spaced apart along a longitudinal axis of said assembly;
 a carriage supported on said base for axial sliding movement relative to said base;
 a seat belt guide on said carriage;
 a latch supported on said carriage for pivotal movement relative to said base about a pivot axis between a disengaged condition movable axially past said projections and an engaged condition engageable with one of said projections to block axial movement of said latch and said carriage relative to said base;
 biasing means on said carriage for biasing said latch into the engaged condition; and
 release means for pivoting said latch from the engaged condition to the disengaged condition;
 said latch having an arcuate engagement surface centered on said pivot axis and engageable with one of said first plurality of projections.

10. An assembly as set forth in claim 9 wherein said latch is deformable in response to application to said seat belt guide of a force having a magnitude greater than a predetermined amount to block movement of said latch from the engaged condition to the disengaged condition.

11. An assembly as set forth in claim 9 comprising a second plurality of projections on said base and a second latch engageable with one of said second plurality of projections, said first plurality of projections being disposed in a staggered relationship relative to said second plurality of projections.

12. An assembly as set forth in claim 11 wherein said first projections and said second projections are placed alternately on either side of said longitudinal axis of said assembly.

13. A vehicle seat belt guide assembly comprising:

a base mountable on a portion of a vehicle, said base including a wall and including a first plurality of projections which project in a first direction from said wall at locations spaced apart along an axis of said assembly;

a carriage supported on said base for axial sliding movement relative to said base;

a seat belt guide on said carriage;

a latch supported on said carriage for movement relative to said base between a disengaged condition and an engaged condition;

said latch when in the engaged condition having an end portion engageable with one of said first plurality of projections to block axial movement of said latch and said carriage relative to said base; and biasing means for biasing said latch into the engaged condition;

said end portion of said latch being deformable in response to application to said seat belt guide of a force having a magnitude greater than a predetermined amount to block movement of said latch from the engaged condition to the disengaged condition;

said latch being supported on said carriage for pivotal movement about a pivot axis between the disengaged condition and the engaged condition, said end portion of said latch when undeformed having an arcuate engagement surface centered on said pivot axis and engageable with said projections.

14. An assembly as set forth in claim 13 wherein said end portion of said latch includes a first part separated by a slot from a second part, said first part being engageable with said projections, said first part being movable toward said second part to close at least partially said slot in response to application to said seat belt guide of a force having a magnitude greater than a predetermined force.

15. An assembly as set forth in claim 13 comprising a second plurality of projections on said base and a second latch engageable with said second plurality of projections, said second latch having a deformable end portion, said deformable end portion of said latch includes a first part separated by a slot from a second part, said first part being engageable with said projections, said first part being movable toward said second part to close at least partially said slot in response to application to said seat belt guide of a force having a magnitude greater than a predetermined force.

16. A vehicle seat belt guide assembly comprising:

a base mountable on a portion of a vehicle, said base including a wall and including a first plurality of projections which project in a first direction from said wall at locations spaced apart along an axis of said assembly;

a carriage supported on said base for axial sliding movement relative to said base;

a seat belt guide on said carriage;

a latch supported on said carriage for movement relative to said base between a disengaged condition and an engaged condition;

said latch when in the engaged condition having an end portion engageable with one of said first plurality of projections to block axial movement of said latch and said carriage relative to said base; and biasing means for biasing said latch into the engaged condition;

said end portion of said latch being deformable in response to application to said seat belt guide of a force having a magnitude greater than a predetermined amount to block movement of said latch from the engaged condition to the disengaged condition; and having a second plurality of projections on said base and a second latch engageable with said second plurality of projections, said second latch having a deformable end portion;

said first plurality of projections is disposed in a staggered relationship relative to said second plurality of projections.

17. A seat belt webbing guide height adjuster assembly comprising:

a base including first and second columns of locking features, said first column of locking features disposed in a staggered relationship relative to said second column of locking features on opposite sides of an axis of said assembly;

a carriage supported on said base for axial sliding movement relative to said base;

a seat belt webbing guide on said carriage;

a first latch part on said carriage, said first latch part being movable between a disengaged condition movable axially past said first locking features and an engaged condition engageable with one of said first locking features to block axial movement of said first latch part and said carriage relative to said base;

a second latch part on said carriage, said second latch part being movable between a disengaged condition movable axially past said second locking features and an engaged condition engageable with one of said second locking features to block axial movement of said second latch part and said carriage relative to said base;

biasing means for biasing said first and second latch parts into the engaged condition; and release means for moving said first and second latch parts to the disengaged condition.

18. An assembly as set forth in claim 17 wherein said first and second latch parts are independently movable first and second latches.

19. An assembly as set forth in claim 17 wherein said locking features are projections which project from a rear wall of said base.

* * * * *